Figure 1:
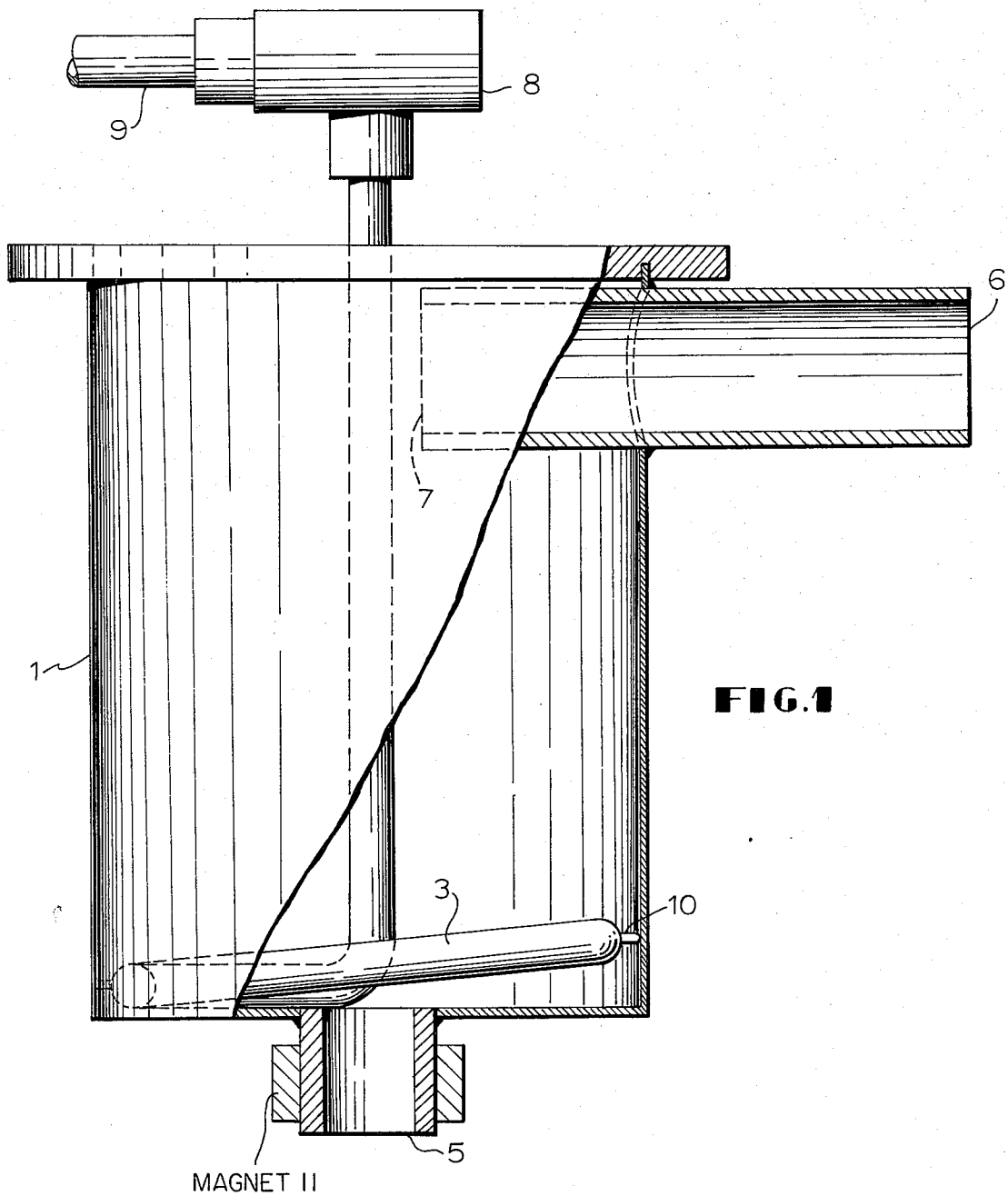

United States Patent [19]
Hurley

[11] 3,913,340
[45] Oct. 21, 1975

[54] SUPPLY APPARATUS FOR CRYOGENIC LIQUIDS

[75] Inventor: Joseph John Hurley, Paisley, Scotland

[73] Assignee: J. & P. Coats Limited, Glasgow, Scotland

[22] Filed: July 31, 1973

[21] Appl. No.: 384,309

[30] Foreign Application Priority Data
Aug. 5, 1972 United Kingdom............... 36654/72

[52] U.S. Cl........................ 62/45; 159/6 R; 210/222
[51] Int. Cl.²........................................... F17C 7/02
[58] Field of Search............ 159/2 R, 6 R; 210/222; 62/45; 220/44 A

[56] References Cited
UNITED STATES PATENTS

| | | | |
|---|---|---|---|
| 2,622,937 | 12/1952 | Taylor............................ | 210/222 X |
| 2,843,534 | 7/1958 | Harper............................. | 159/6 R |
| 3,550,669 | 12/1970 | Lippert et al...................... | 159/6 R |
| 3,648,472 | 3/1972 | Kozlowski............................. | 62/45 |

Primary Examiner—William F. O'Dea
Assistant Examiner—Ronald C. Capossela
Attorney, Agent, or Firm—John Lezdey

[57] ABSTRACT

An apparatus for use in the supply of cryogenic liquid incorporates a liquid injection nozzled located adjacent one end of a cylindrical chamber the nozzle being connected to the discharge outlet of an expansion valve connectible to a liquid storage tank. The nozzle is so arranged that its line of discharge has a circumferential component of direction with respect to the chamber. The chamber is formed with a liquid discharge opening on the axis of the chamber at the end adjacent the nozzle and with a vapour discharge opening at the other end. The entrance to the vapour discharge opening is located close to the axis of the chamber. The nozzle may be presented by a pipe curved in a helical curve.

3 Claims, 2 Drawing Figures

SUPPLY APPARATUS FOR CRYOGENIC LIQUIDS

This invention relates to apparatus for use in the supply of cryogenic liquid to a plant which uses such a liquid.

A well known cryogenic liquid used in many industrial process is liquid ammonia ($NH_3$), for example in the textile industry it is known to treat certain textile materials with liquid ammonia at a temperature below its boiling point at atmospheric pressure, i.e. −33.4°C. It is customary to store liquid ammonia in storage tanks. As it is extremely expensive to provide cryogenic vessels which maintain liquid ammonia at below its boiling temperature it is customary to store the liquid ammonia in ordinary pressure tanks exposed to the ambient temperature and allow some of the ammonia to evaporate by the heat absorbed and produce a vapour pressure above the surface of the liquid sufficient to maintain the ammonia in the liquid phase even although its temperature is higher than its boiling point at atmospheric pressure. The trouble is, however, that in some treatment processes the ammonia must be used in the liquid form at atmospheric pressure and this implies that its temperature must be not higher than its boiling point at atmospheric pressure. It is an object of the present invention to provide an apparatus which will supply a cryogenic liquid such as ammonia as a stable liquid at atmospheric pressure from a supply obtained from a pressurized tank.

An apparatus according to the invention incorporates a cylindrical chamber, a liquid injection nozzle located adjacent one end of the chamber and so orientated that its line of discharge into the chamber has a component of direction which is circumferential with respect to the cylindrical chamber, a liquid discharge opening on the axis of the cylindrical chamber at the end of the chamber adjacent the nozzle, a vapour discharge opening at the other end of the cylindrical chamber, the entrance to said vapour discharge opening being located close to the axis of the chamber, and an expansion valve the discharge outlet of which is connected to the nozzle and the inlet of which is connectible to a liquid storage tank.

The nozzle may be constituted by the open end of a curved pipe located within the chamber, the other end of the pipe being connected to the expansion valve. Preferably the portion of the pipe leading to the expansion valve is taken radially inwards towards the axis of the chamber and then passes co-axially of the chamber through the end of the chamber remote from the liquid discharge opening. The curved pipe terminating at the discharge nozzle may be curved in a helical curve, the line of discharge of the nozzle then having an axial component of direction directed towards the other end of the chamber as well as a circumferential component of direction.

The vapour discharge opening may be presented by a pipe penetrating the wall of the chamber with its axis radial to the axis of the chamber, the open end of the pipe within the chamber being located close to the axis of the chamber.

The curved pipe presenting the nozzle may be fitted with spacers to hold it in position within the chamber a predetermined distance from the wall of the chamber.

There may be provided at the end of the chamber formed with the liquid discharge opening magnets arranged to set up a magnetic field which must be traversed by liquid flowing to the liquid discharge opening.

Figure 2:
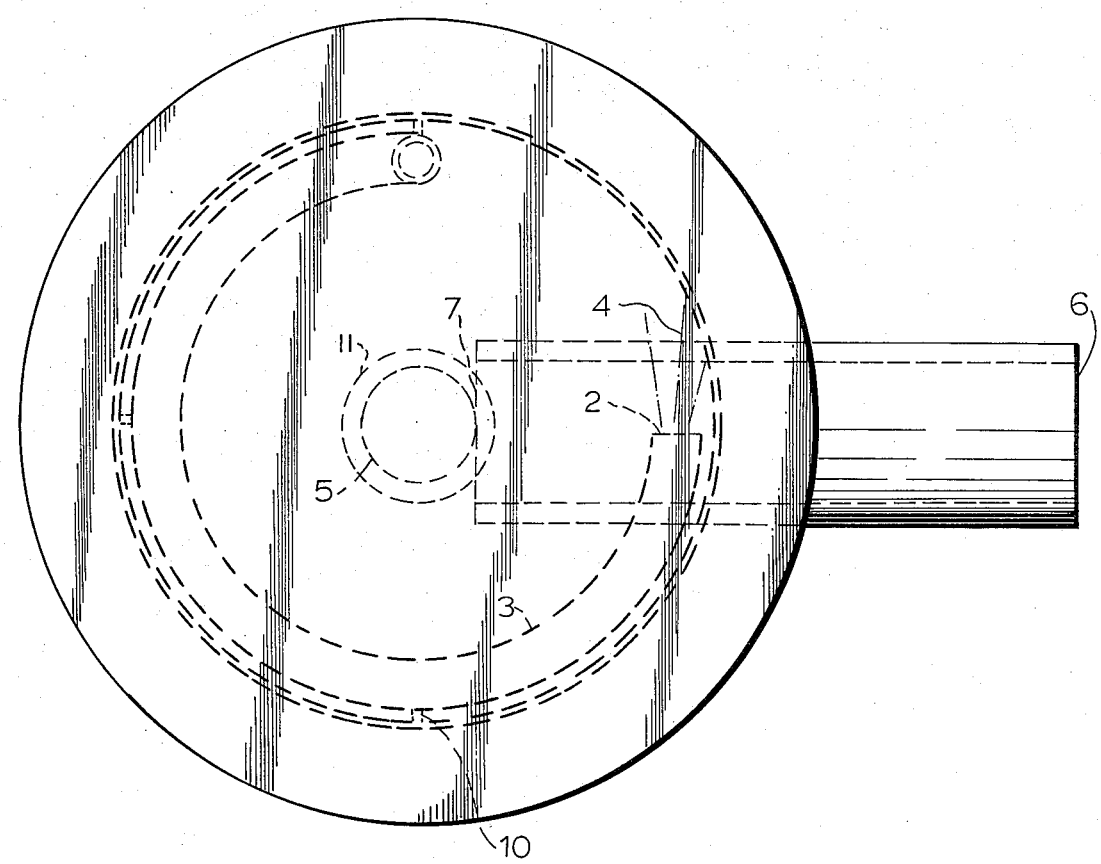

A practical embodiment of the invention is illustrated in the accompanying drawings in which FIG. 1 is a part section of the apparatus and FIG. 2 is a view looking in the direction of the arrow A in FIG. 1.

In the drawings 1 denotes a cylindrical chamber and 2 denotes a liquid injection nozzle constituted by the open end of a curved pipe 3, the nozzle being so orientated that the line of discharge of the nozzle indicated by 4 has a component of direction which is circumferential with respect to the cylindrical chamber 1 so that liquid discharged from the nozzle will strike the wall of the chamber and swirl around the wall of the chamber, 5 denotes a liquid discharge opening on the axis of the cylindrical chamber at the end of the chamber adjacent the nozzle 2, said end of the chamber when the apparatus is in use being the bottom end of the chamber. 6 denotes a vapour discharge opening at the other end of the chamber 1, the entrance 7 to the vapour discharge opening 6 being located close to the axis of the chamber 1. 8 denotes an expansion valve the inlet of which is connectible by a pipe connection 9 to a liquid ammonia storage tank and the discharge outlet of which is connectible to the curved pipe 3. The curved pipe 3 is arranged as a portion of a helix so that the pipe 3 does not interfere with liquid discharged from the nozzle 2 because the line of discharge 4 has an axial component directed towards the end of the chamber at which the discharge opening 6 is located. 10 denotes spacers holding the curved pipe 3 within the chamber a predetermined distance from the wall of the chamber. 11 denotes magnets arranged in a ring surrounding the liquid discharge opening 5 so that liquid flowing to the opening 5 from the wall of the chamber has to traverse the magnetic field set up by the magnets.

In practice, the apparatus is used with the axis of the chamber 1 vertical and the discharge nozzle 2 at the bottom end of the chamber. Where the apparatus is connected to a tank containing liquid ammonia, liquid ammonia at a temperature above its boiling point at atmospheric pressure and a pressure above atmospheric pressure is led to the nozzle 2 through the expansion valve 8 and issues from the nozzles 2 in a stream at atmospheric pressure. This stream meets the wall of the cylindrical chamber 1 and swirls around the wall. Because of the reduction in pressure to which the liquid ammonia has been subjected in the expansion valve 8, some of the liquid ammonia as it issues from the nozzle 2 evaporates and in evaporating absorbs heat from the remainder of the liquid ammonia. The loss of heat brings the remainder of the liquid ammonia to a temperature below its boiling point at atmospheric pressure. The cooled liquid ammonia swirls around and up the wall of the chamber 1 until it loses its forward momentum whereupon it drops to the bottom of the chamber and runs out of the liquid discharge opening 5 as a liquid at atmospheric pressure and at a temperature below its boiling point at that pressure. Because of the centrifugal force on the stream of liquid ammonia being discharged from the nozzle the liquid remains hugging the wall of the chamber 1 and none of the liquid can escape from the vapour discharge opening 6 because the entrance 7 to this opening is close to the axis of the chamber. The ammonia gas which formed on the expansion, having so much less mass than the liquid, can find its way radially inwards to the entrance 7 to the vapour discharge opening 6 and escape through the vapour discharge opening. The liquid ammonia left is thus free of gas bubbles. The liquid ammonia passing across the bottom of the chamber to the liquid discharge opening 5 passes through the magnetic field set up by the magnets and iron particles which customarily find their way into liquid ammonia which has been in contact with parts made of ferrous metal are separated out from the liquid. It is necessary to remove all particles of iron from ammonia used in textile treatment because iron particles have a deleterious effect on textile dyeing processes and any such particles which become lodged in the textile material being treated with the ammonia would spoil any subsequent dyeing operation on the material.

Iron particles removed from the liquid ammonia are cleaned out of the chamber periodically by opening the chamber and removing the curved tube 3 presenting the nozzle 2.

What is claimed is:

1. An apparatus for use in the supply of cryogenic liquid incorporating a chamber having a smooth cylindrical bore, a liquid injection nozzle located adjacent one end of said chamber and so orientated that its line of discharge into the chamber has a component of direction which is circumferential with respect to the cylindrical chamber, a liquid discharge opening at one end of said chamber adjacent said nozzle, and a vapour discharge opening at the other end of the cylindrical chamber, said nozzle being constituted by the open end of a pipe located within the chamber and curved in a helical curve so that the line of discharge of the nozzle has an axial component of direction directed towards the other end of the chamber in addition to its circumferential component of direction, said liquid discharge opening being co-axial with said chamber; said vapour discharge opening being presented by a pipe penetrating the wall of the chamber with its axis radial to the axis of the chamber, the open end of said pipe within the chamber being located close to the axis of said chamber, and an expansion valve having its discharge outlet connected to said curved pipe at the end remote from the nozzle and its inlet connectible to a liquid storage tank.

2. An apparatus of claim 1 in which the connection of the outlet of the expansion valve to the control pipe is constituted by a pipe which follows a path which lies radially inwards from said curved pipe to the axis of the chamber then along the axis of the chamber to the end of the chamber remote from the nozzle and through said end of the chamber to the expansion valve.

3. An apparatus as claimed in claim 1 in which the curved pipe presenting the nozzle is fitted with spacers to hold it in position within the chamber a predetermined distance from the wall of the chamber.

* * * * *

UNITED STATES PATENT OFFICE
CERTIFICATE OF CORRECTION

Patent No. 3,913,340  Dated October 21, 1975

Inventor  JOSEPH JOHN HURLEY

It is certified that error appears in the above-identified patent and that said Letters Patent are hereby corrected as shown below:

In the Claims:

Claim 2, line 2, delete "control", insert -- curved --

Signed and Sealed this twenty-seventh Day of January 1976

[SEAL]

Attest:

RUTH C. MASON
Attesting Officer

C. MARSHALL DANN
Commissioner of Patents and Trademarks